US012674867B2

(12) United States Patent
Yang et al.

(10) Patent No.: US 12,674,867 B2
(45) Date of Patent: Jul. 7, 2026

(54) LASER RADAR AND METHOD FOR PERFORMING DETECTION BY USING THE SAME

(71) Applicant: HESAI TECHNOLOGY CO., LTD., Shanghai (CN)

(72) Inventors: Jintao Yang, Shanghai (CN); Shaoqing Xiang, Shanghai (CN)

(73) Assignee: Hesai Technology Co., Ltd., Shanghai (CN)

( * ) Notice: Subject to any disclaimer, the term of this patent is extended or adjusted under 35 U.S.C. 154(b) by 992 days.

(21) Appl. No.: 17/733,954

(22) Filed: Apr. 29, 2022

(65) Prior Publication Data

US 2022/0260677 A1 Aug. 18, 2022

Related U.S. Application Data

(63) Continuation of application No. PCT/CN2020/122660, filed on Oct. 22, 2020.

(30) Foreign Application Priority Data

Nov. 1, 2019 (CN) .......................... 201911058120.6
Nov. 19, 2019 (CN) .......................... 201911137252.8

(51) Int. Cl.
*G01S 7/481* (2006.01)
*G01S 17/00* (2020.01)
*G01S 17/42* (2006.01)

(52) U.S. Cl.
CPC ............ *G01S 7/481* (2013.01); *G01S 7/4817* (2013.01); *G01S 17/003* (2013.01); *G01S 17/42* (2013.01)

(58) Field of Classification Search
CPC ........ G01S 7/481; G01S 17/42; G01S 7/4813; G01S 7/4817
See application file for complete search history.

(56) References Cited

U.S. PATENT DOCUMENTS 7,136,153 B2 11/2006 Mori et al.
10,324,184 B1 * 6/2019 Duan ................... G01S 7/4817
(Continued)

FOREIGN PATENT DOCUMENTS

CN 2779424 Y 5/2006
CN 101963869 A 2/2011
(Continued)

OTHER PUBLICATIONS

First Search dated Oct. 18, 2024, issued in related Chinese Application No. 201980097646.7 (2 pages).
(Continued)

*Primary Examiner* — Yuqing Xiao
*Assistant Examiner* — Rachel Nguyen
(74) *Attorney, Agent, or Firm* — Sheppard Mullin Richter & Hampton LLP

(57) ABSTRACT

The present invention relates to a lidar, including: a laser emitter, configured to emit a laser beam; an emitting lens, disposed downstream of an optical path of the laser emitter, configured to emit a detection light beam after shaping the laser beam, and the emitting lens including an diaphragm region; a receiving lens, configured to receive a reflected light beam of the detection light beam after being reflected outside the lidar; and a compensation lens, disposed in a diaphragm region of the emitting lens, configured to receive at least a part of the laser beam and/or the detection light beam and redirect the received part of the laser beam and/or the detection light beam toward the receiving lens.

10 Claims, 12 Drawing Sheets

(56) References Cited

U.S. PATENT DOCUMENTS

| | | | | |
|---|---|---|---|---|
| 10,802,113 | B2 * | 10/2020 | Wang | ................. G02B 19/0061 |
| 2008/0007711 | A1 | 1/2008 | Liu | |
| 2016/0307957 | A1 * | 10/2016 | A Tharumalingam | ....................... G01S 7/481 |
| 2018/0143301 | A1 | 5/2018 | Badoni et al. | |
| 2019/0120962 | A1 * | 4/2019 | Gimpel | ................. G01S 7/4808 |
| 2022/0120869 | A1 | 4/2022 | Yang et al. | |

FOREIGN PATENT DOCUMENTS

| | | | | |
|---|---|---|---|---|
| CN | 201936009 | U | 8/2011 | |
| CN | 103018735 | A | 4/2013 | |
| CN | 203053429 | U | 7/2013 | |
| CN | 103954955 | A | 7/2014 | |
| CN | 104502067 | A | 4/2015 | |
| CN | 104833966 | A | 8/2015 | |
| CN | 106291574 | A * | 1/2017 | ............ G01S 17/08 |
| CN | 205861904 | U * | 1/2017 | |
| CN | 106383354 | A | 2/2017 | |
| CN | 106872961 | A * | 6/2017 | ............ G01S 7/481 |
| CN | 107132519 | A | 9/2017 | |
| CN | 108594263 | A | 9/2018 | |
| CN | 108802763 | A | 11/2018 | |
| CN | 108873125 | A | 11/2018 | |
| CN | 208421218 | U | 1/2019 | |
| CN | 109814082 | A | 5/2019 | |
| CN | 111090082 | A | 5/2020 | |
| CN | 112444791 | A * | 3/2021 | ............ G01S 7/481 |
| DE | 102016208713 | A1 | 11/2017 | |
| JP | 2005-055226 | A | 3/2005 | |
| JP | 2007-333592 | A | 12/2007 | |

OTHER PUBLICATIONS

PCT International Search Report and the Written Opinion mailed Jan. 21, 2021, issued in related International Application No. PCT/CN2020/122660, with partial English translation (12 pages).

PCT International Search Report and the Written Opinion mailed Jun. 4, 2020, issued in related International Application No. PCT/CN2019/103724, with English translation (15 pages).

PCT International Preliminary Report on Patentability mailed Mar. 10, 2022, issued in related International Application No. PCT/CN2019/103724, with English translation (10 pages).

First Search dated Jun. 6, 2021, issued in related Chinese Application No. 201911137252.8 (2 pages).

First Office Action dated Jun. 18, 2021, issued in related Chinese Application No. 201911137252.8, with English machine translation (12 pages).

Second Office Action dated Mar. 7, 2022, issued in related Chinese Application No. 201911137252.8, with English machine translation (11 pages).

PCT International Preliminary Report on Patentability mailed May 12, 2022, issued in related International Application No. PCT/CN2020/122660, with English translation (14 pages).

* cited by examiner a              b

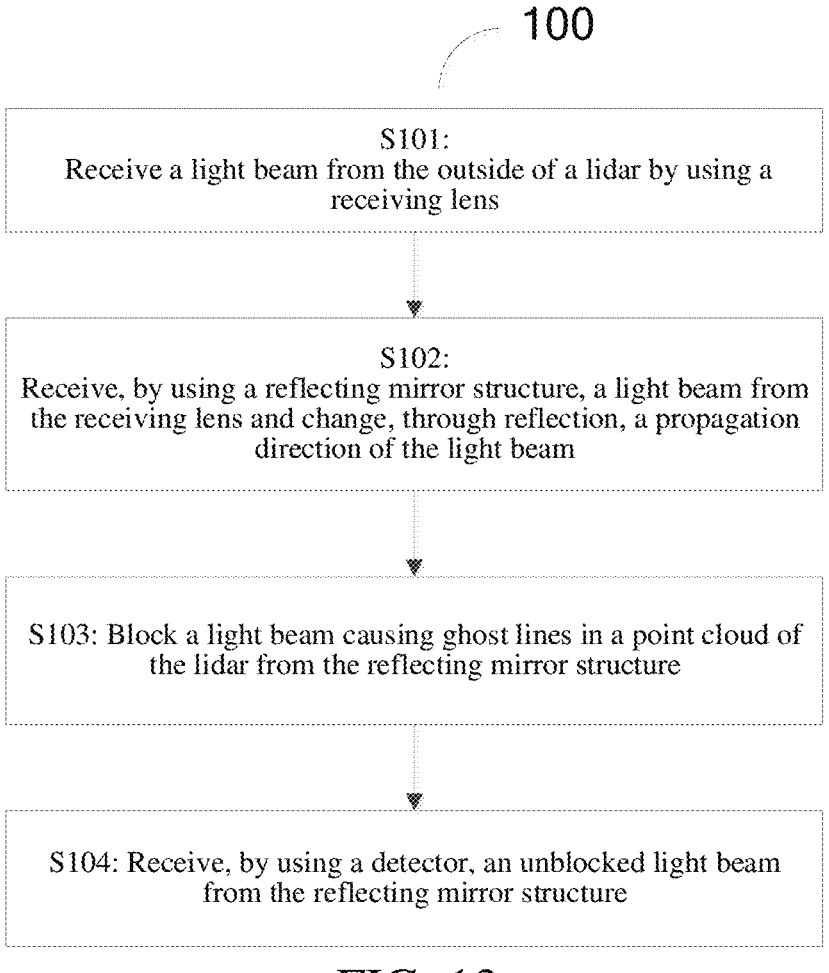

100

S101:
Receive a light beam from the outside of a lidar by using a receiving lens S102:
Receive, by using a reflecting mirror structure, a light beam from the receiving lens and change, through reflection, a propagation direction of the light beam S103: Block a light beam causing ghost lines in a point cloud of the lidar from the reflecting mirror structure S104: Receive, by using a detector, an unblocked light beam from the reflecting mirror structure

LASER RADAR AND METHOD FOR PERFORMING DETECTION BY USING THE SAME

CROSS-REFERENCE TO RELATED APPLICATIONS

This application is a continuation of co-pending International Patent Application No. PCT/CN2020/122660, filed on Oct. 22, 2020, which claims priority to and the benefit of Chinese Patent Application No. 201911058120.6, filed on Nov. 1, 2019, and Chinese Patent Application No. 201911137252.8, filed on Nov. 19, 2019. The disclosures of the above applications are incorporated by reference in their entireties.

TECHNICAL FIELD

The present invention relates to the field of photoelectric technologies, and in particular, to a lidar and a method for performing detection using the same.

BACKGROUND

A lidar includes a laser emitting system and a detection receiving system. After encountering a target, an emitted laser is reflected and received by a detection system. A distance from a corresponding target point may be determined by measuring a round-trip time of the laser (for example, a time-of-flight method). After an entire target region is scanned and detected, three-dimensional imaging may be finally achieved. The lidar has an important application in an autonomous driving system. Such application prefers a Lidar to have features such as high imaging frame rate, high resolution, long-distance ranging capability, small size, high reliability, and low cost.

Currently, emitting systems and receiving systems of most lidars are separately disposed, which are different from a case that the emitting system and the receiving system share a set of lenses. To measure a long-distance target, a laser emitting light beam and a field of view of a detector are aligned at a long distance (for example, 200 m). As shown in FIG. 1, the laser emitting light beam and the field of view of the detector are not overlapped in a range of a certain distance from the lidar. Therefore, in this distance range, the detector of the lidar cannot receive signal light reflected by a target or the received signal light is extremely weak, which is a short-distance blind region.

A reason for the blind region or the weak signal at a short distance from the lidar is a non-coaxial design of the optical path for the separated receiving and emitting systems, that is, a laser emitting optical path and a signal receiving optical path is not a completely overlapped coaxial optical path structure. Referring to FIG. 1, there is a horizontal translation between an emitting lens and a receiving lens. The applicant found two possible causes.

A first cause: Referring to FIG. 1, the short-distance blind region is a region where an emitted laser beam does not overlap a receiving field of view at a short distance. This means that a detector of the lidar "cannot see" the emitted laser beam in this region, that is, the detector cannot receive signal light reflected by a target in this region.

A second cause: Referring to FIG. 2, there is a target within the short-distance blind region, and an imaging point, formed via the receiving lens and by the signal light reflected by a short-distance target, is behind the focal plane of the receiving lens, rather than on the focal plane. In addition, because the short-distance target is above an optical axis of the receiving lens, the imaging point of the short-distance target formed via the receiving lens is below the optical axis of the receiving lens. Reflecting the two effects, a relative position between a focal point of reflected light of a short-distance target and a detector is shown in FIG. 2. The detector of the lidar receives no reflected signal from the target within a short-distance blind region of the lidar.

The content of the related art is merely technologies known to the inventor, and does not necessarily represent available prior art in the field.

SUMMARY

In view of at least one defect in the related art, the present invention provides a lidar, including:

a laser emitter, configured to emit a laser beam;

an emitting lens, disposed downstream of an optical path of the laser emitter, configured to emit a detection light beam after shaping the laser beam, and the emitting lens comprising a diaphragm region;

a receiving lens, configured to receive a reflected light beam of the detection light beam after being reflected outside the lidar; and a compensation lens, disposed in the diaphragm region of the emitting lens, and configured to receive at least a part of the laser beam and/or the detection light beam and redirect the received part of the laser beam and/or the detection light beam toward the receiving lens.

According to an aspect of the present invention, the diaphragm region is located on a side of the emitting lens close to the laser emitter, or a side of the emitting lens far from the laser emitter, or in the middle of the emitting lens.

According to an aspect of the present invention, the compensation lens includes one or more of a wedge prism, a micro prism, and a diffractive optical element, or a combination of the wedge prism, the micro prism, and the diffractive optical element with a spherical lens or a cylindrical lens, and the compensation lens is fixed in the diaphragm region by using a binder or a bracket.

According to an aspect of the present invention, the compensation lens is located at a position of the diaphragm region close to the receiving lens.

According to an aspect of the present invention, the emitting lens and the receiving lens are disposed in parallel in a horizontal direction, and a position of the compensation lens satisfies first relations:

$$\frac{d + D/2}{L} = \tan\theta_1$$

$$L' = L - D/\tan\theta_1$$

where $\theta_1$ is a redirection angle of a light beam, which is an angle between a light beam redirected via the compensation lens and a light beam received by the receiving lens, d is a distance between a mounting position of the compensation lens and a center of the receiving lens, D is a diameter of the receiving lens, and a difference between L and L' represents a short-distance region with enhanced signals, marked by the distance between the outmost point of the receiving lens and an intersection point that is formed by the redirected light beam via the compensation lens and the reflected light beam, and L represents the farthest range while L' represents the nearest range.

According to an aspect of the present invention, an angle between a light beam redirected by the compensation lens and a main field of view of the lidar is less than an angle between a ghost line field of view and the main field of view, and the lidar further includes a reflecting mirror structure and a detector at a receiving end sequentially disposed downstream of an optical path of the receiving lens, and further includes a module for reducing ghost lines that is disposed between the reflecting mirror structure and the detector to prevent a light beam that causes a ghost line in a point cloud of the lidar from being incident on the detector.

According to an aspect of the present invention, the module for reducing ghost lines includes a diaphragm, the diaphragm and the detector satisfying a second relation:

$$\arctan\left(\frac{d1}{2h}\right) \le \arctan\left(\frac{D}{2f}\right)$$

where D is a diameter of the receiving lens, f is a focal length of the receiving lens, h is a distance between the diaphragm and the detector, and d1 is a width of the diaphragm.

According to an aspect of the present invention, the diaphragm is strip-shaped or circular-shaped, and the diaphragm is made of one of metal, glass that is capable of absorbing or reflecting light, or ceramic.

According to an aspect of the present invention, the module for reducing ghost lines includes a light isolation sheet.

According to an aspect of the present invention, the module for reducing ghost lines is configured to block a light beam not reflected once by the reflecting mirror structure.

According to an aspect of the present invention, the reflecting mirror structure includes a first reflecting mirror and a second reflecting mirror disposed opposite to each other, the detector includes a photodiode, and the module for reducing ghost lines is configured to block light beams other than light beams respectively reflected once by the first reflecting mirror and the second reflecting mirror.

The present invention further provides a method for performing detection by using the lidar as described above, including:

emitting, by the laser emitter, a laser beam;

shaping, by the emitting lens, the laser beam and emitting a detection light beam;

receiving, by the receiving lens, a reflected light beam of the detection light beam after being reflected by an object external to the lidar; and receiving, by the compensation lens, at least a part of the laser beam and/or the detection light beam, and redirecting the received part of the laser beam and/or the detection light beam toward the receiving lens.

In the solution of the embodiments of the present invention, a range of a short-distance blind region of a lidar in which emitting systems and receiving systems are separately disposed can be reduced, and/or a signal intensity of short-distance detection can be enhanced.

BRIEF DESCRIPTION OF THE DRAWINGS

The accompanying drawings constituting a part of the present invention are used to provide a further understanding of the present invention. The exemplary embodiments of the present invention and descriptions thereof are used to

Figure 1:
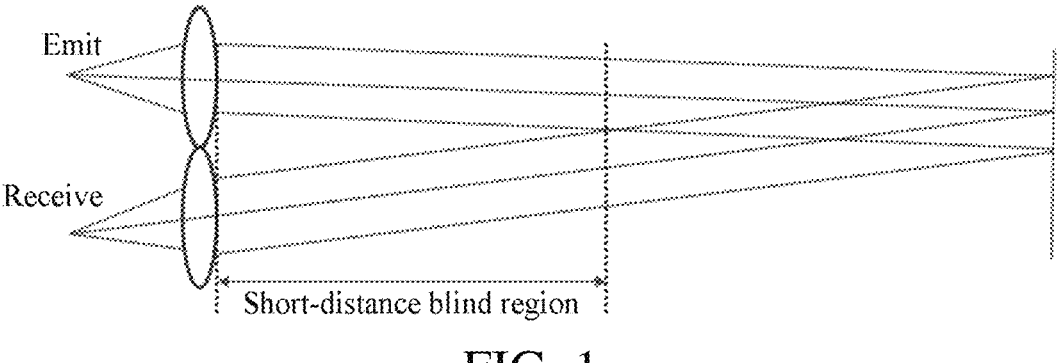
Figure 2:
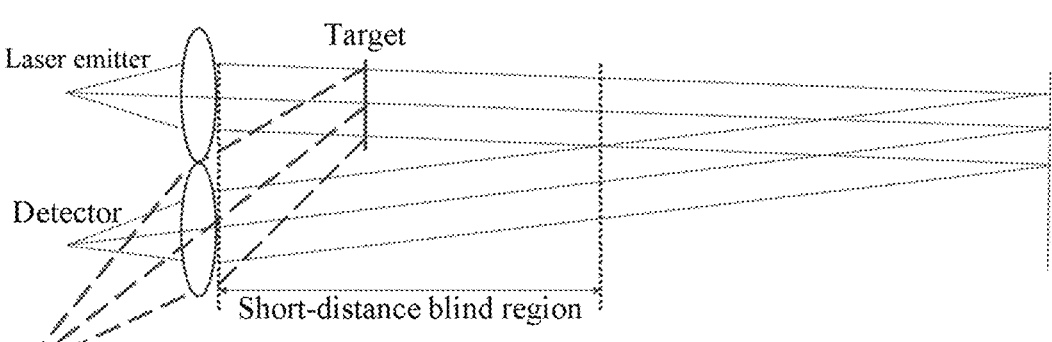
Figure 3:
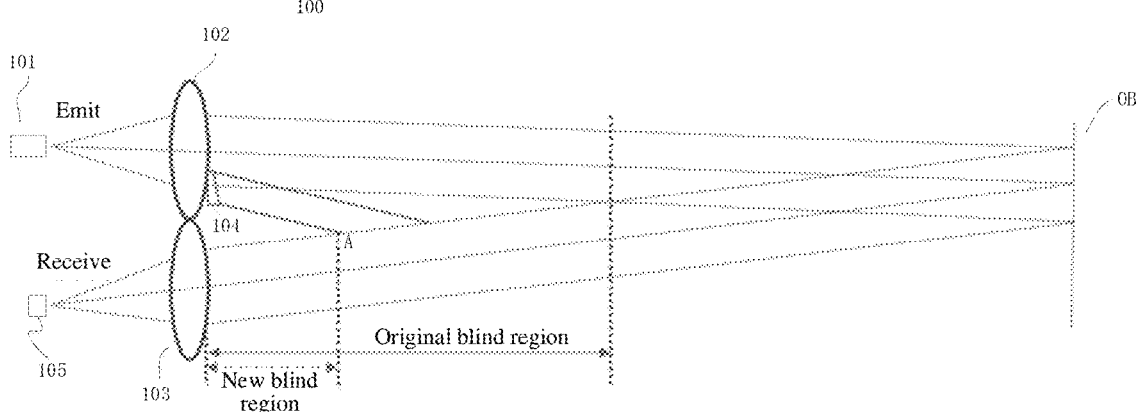
Figure 4:
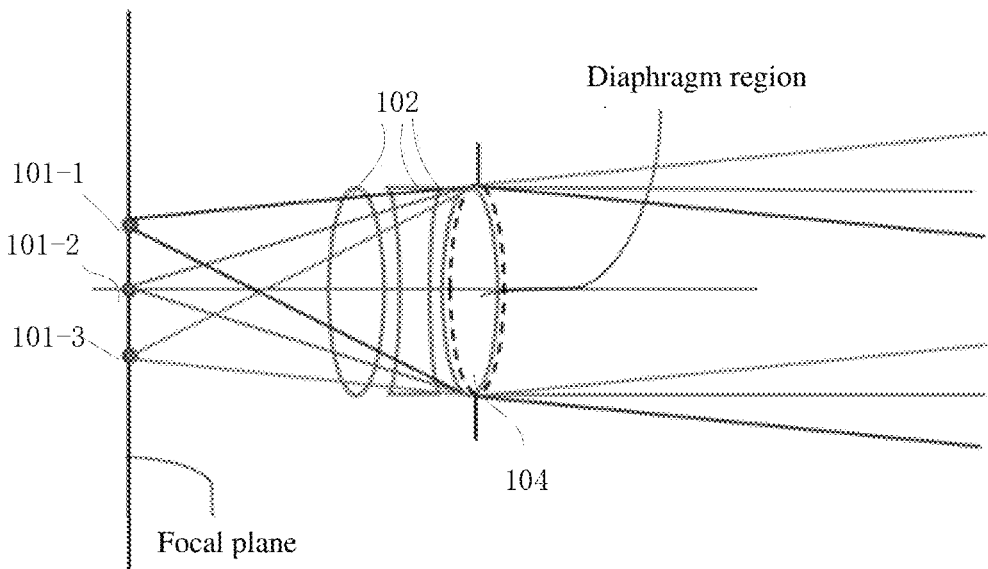
Figure 5:
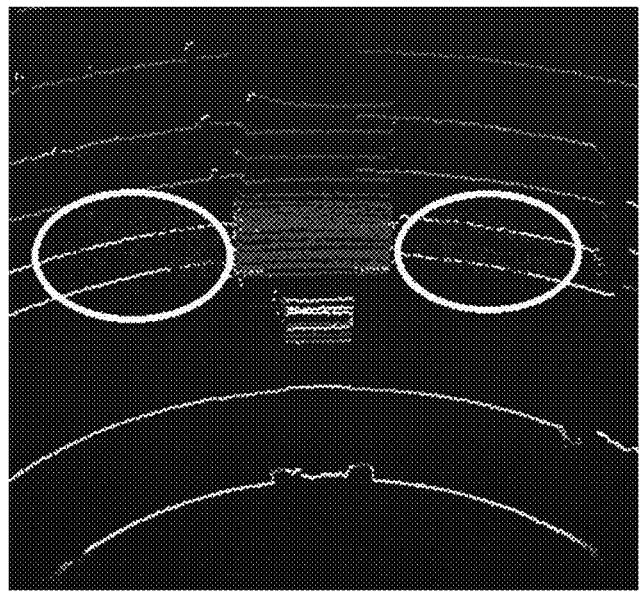
Figure 6:
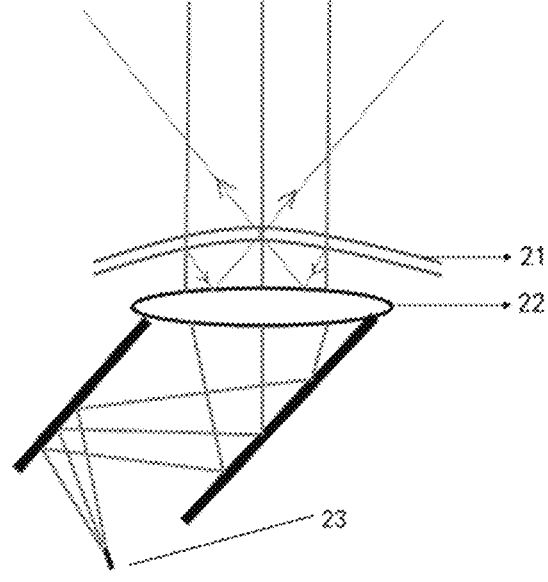
Figure 7:
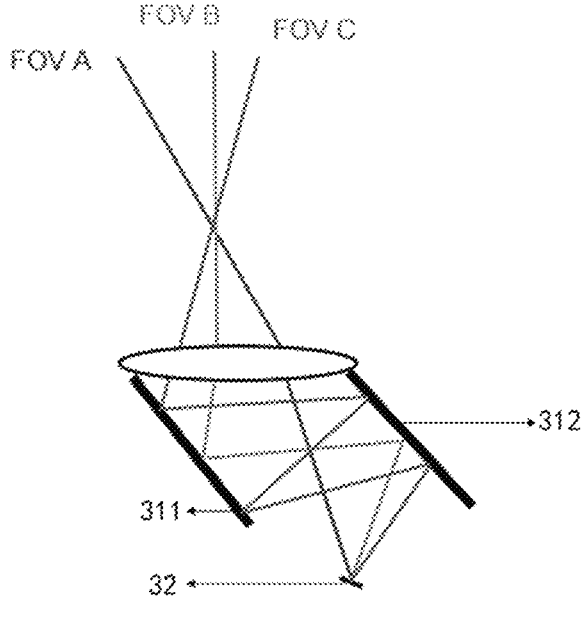
Figure 8A:
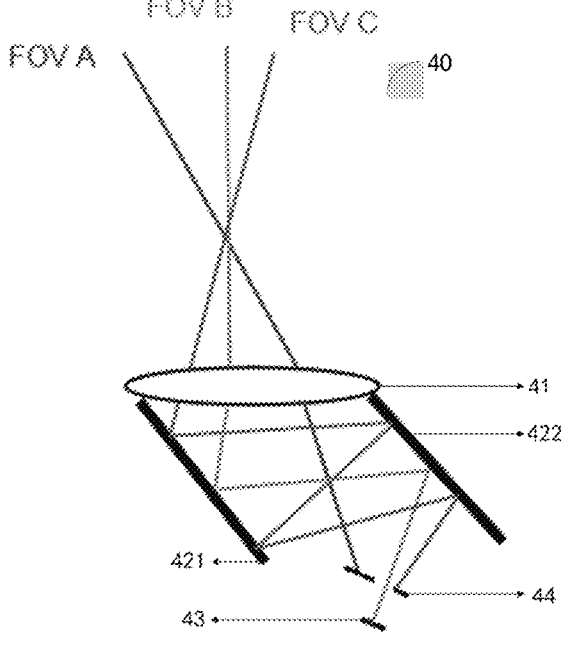
Figure 8B:
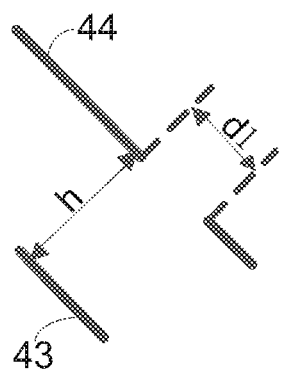
Figure 9:
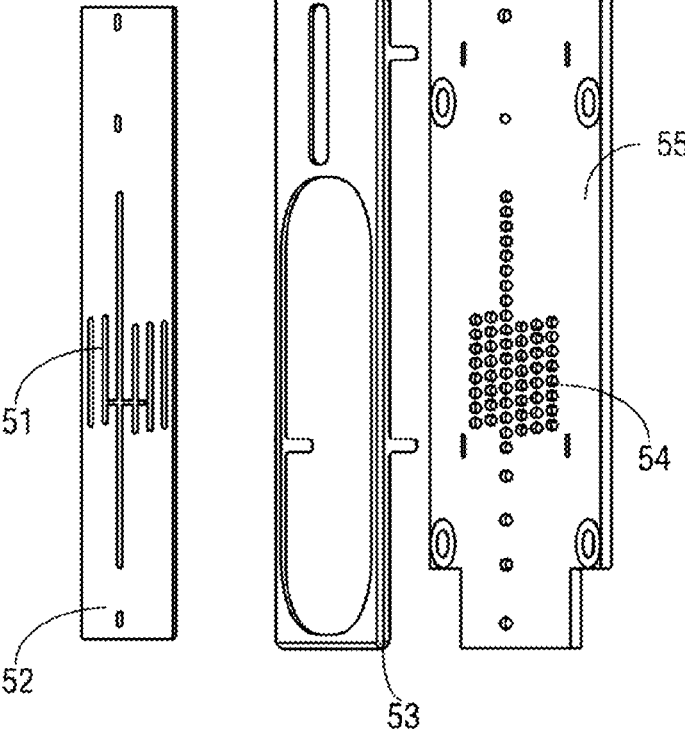
Figure 10:
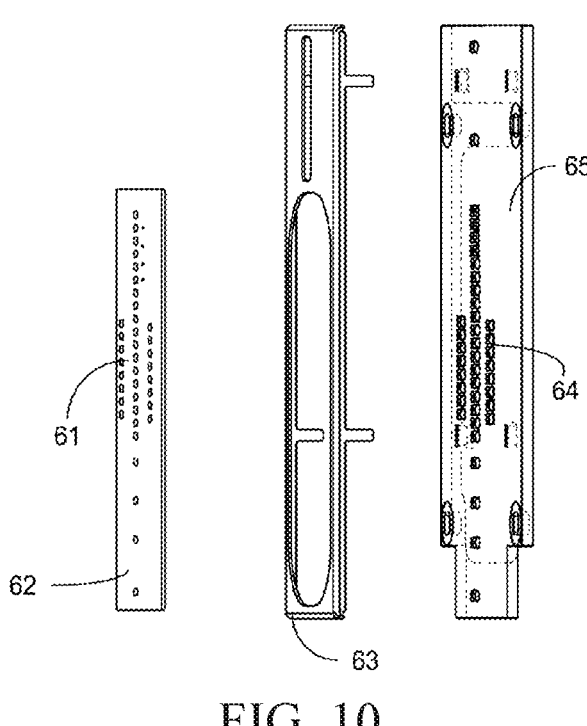
Figure 11:
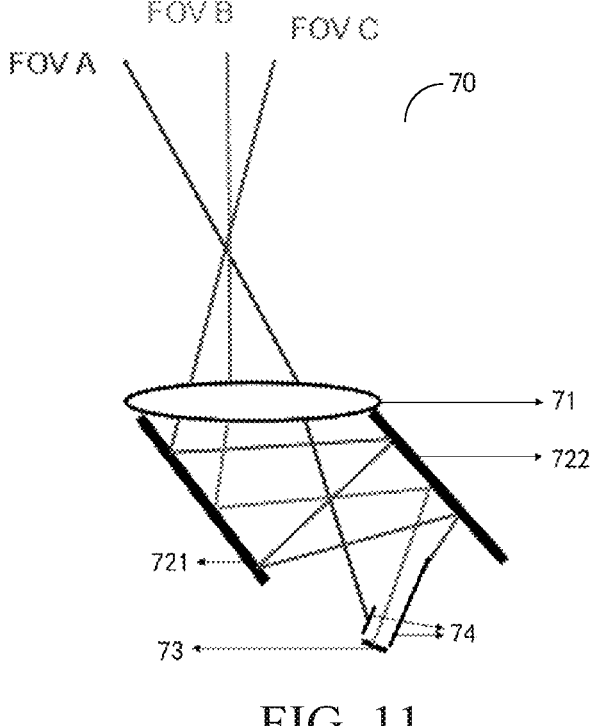
Figure 12:
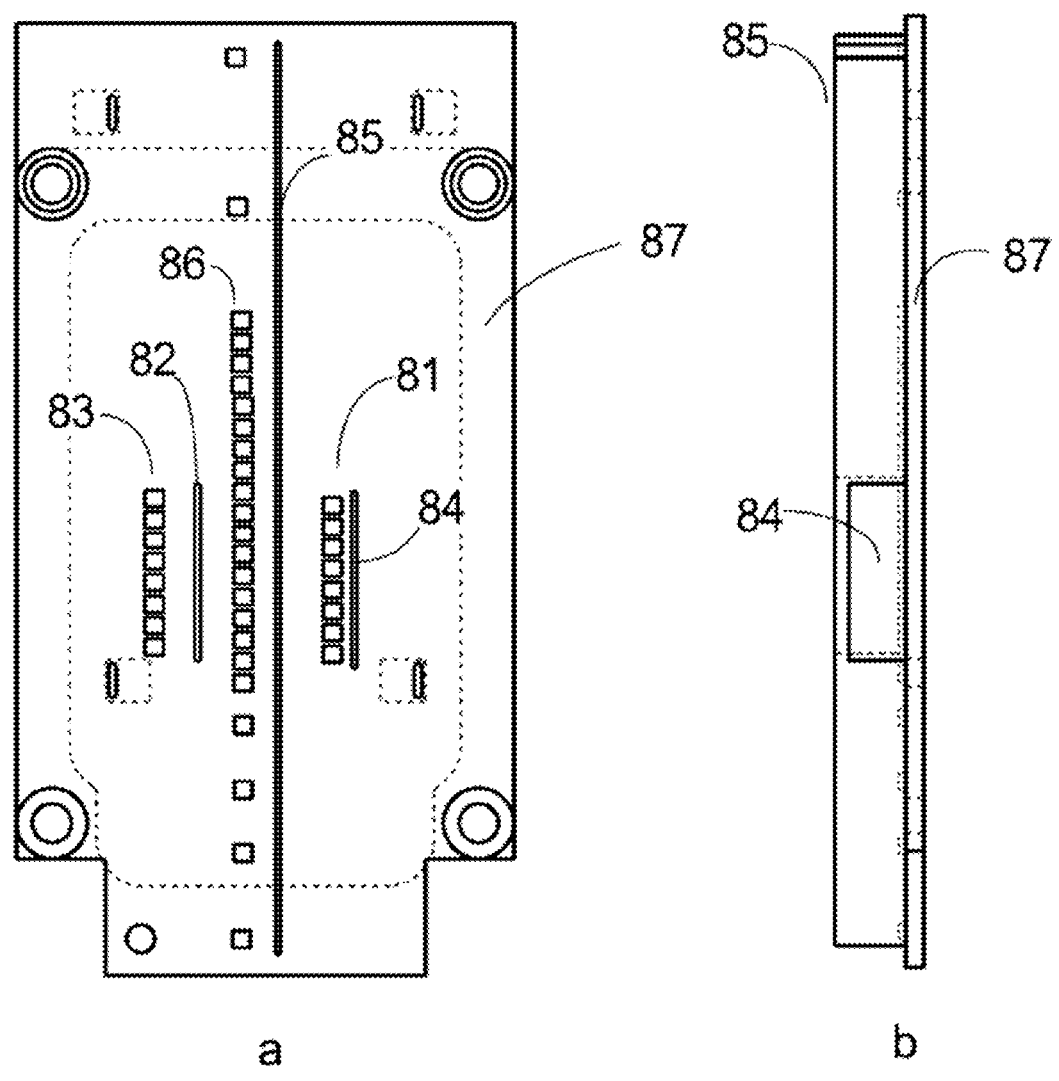
Figure 14:
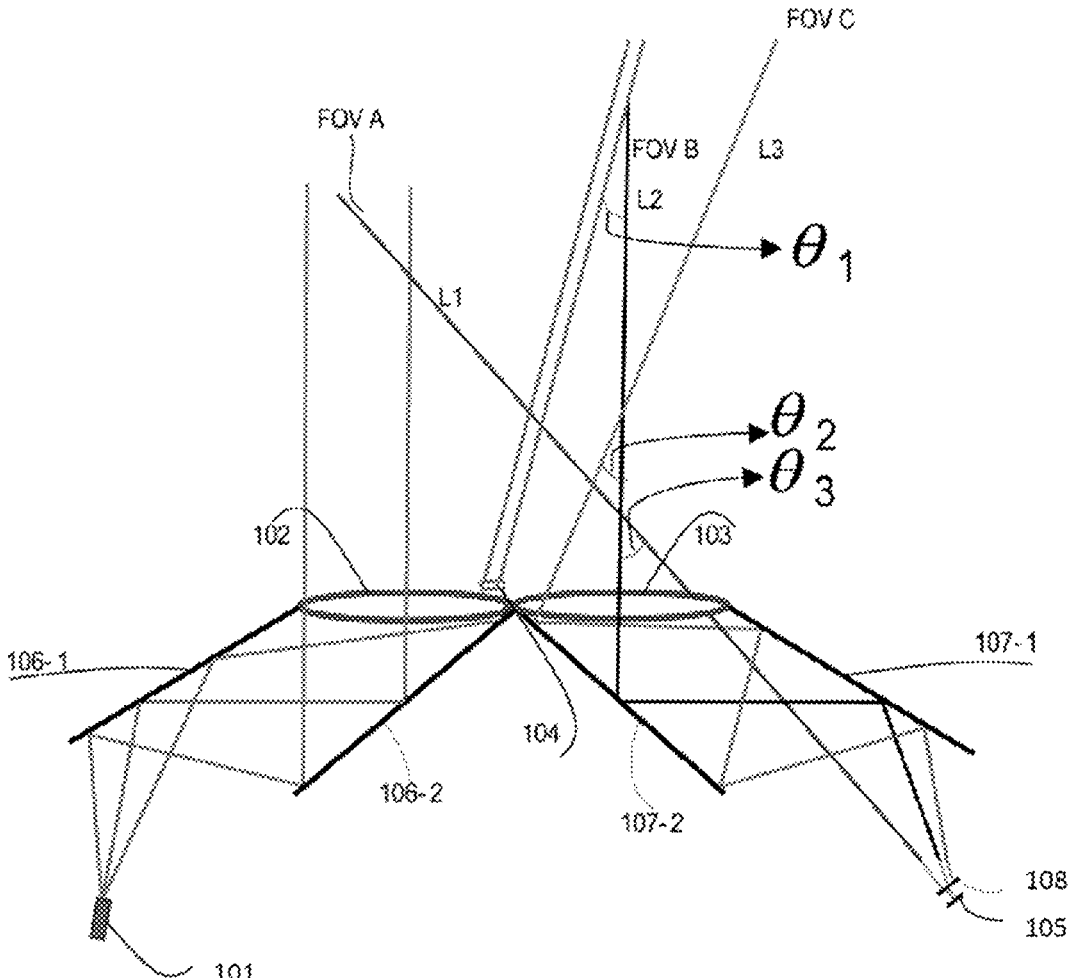
Figure 15:
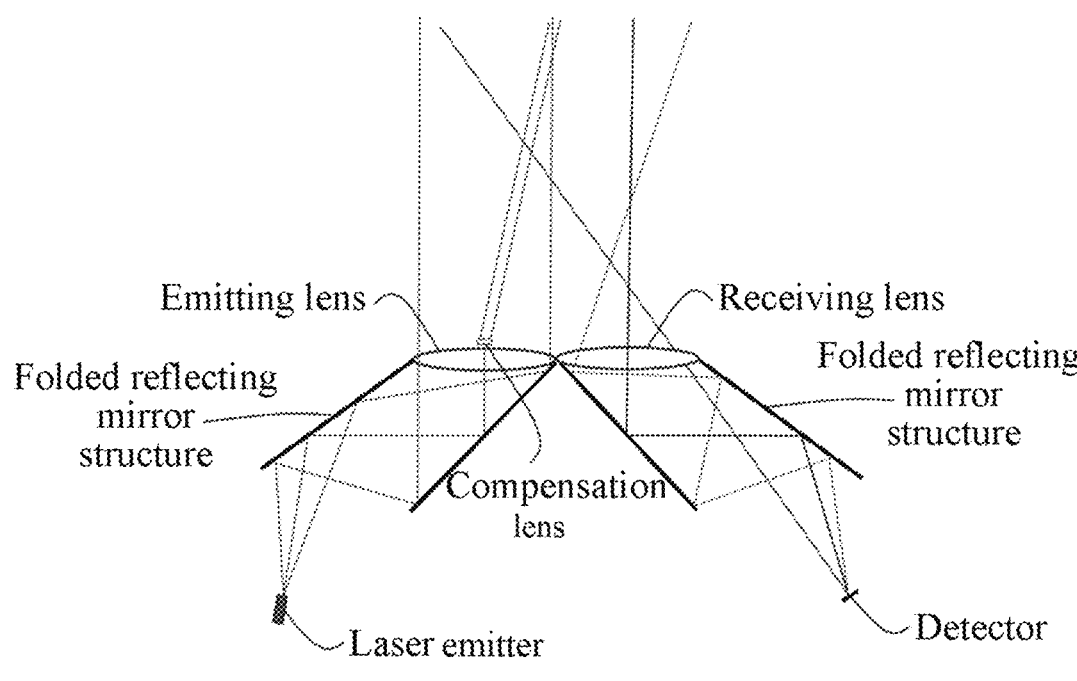
Figure 16:
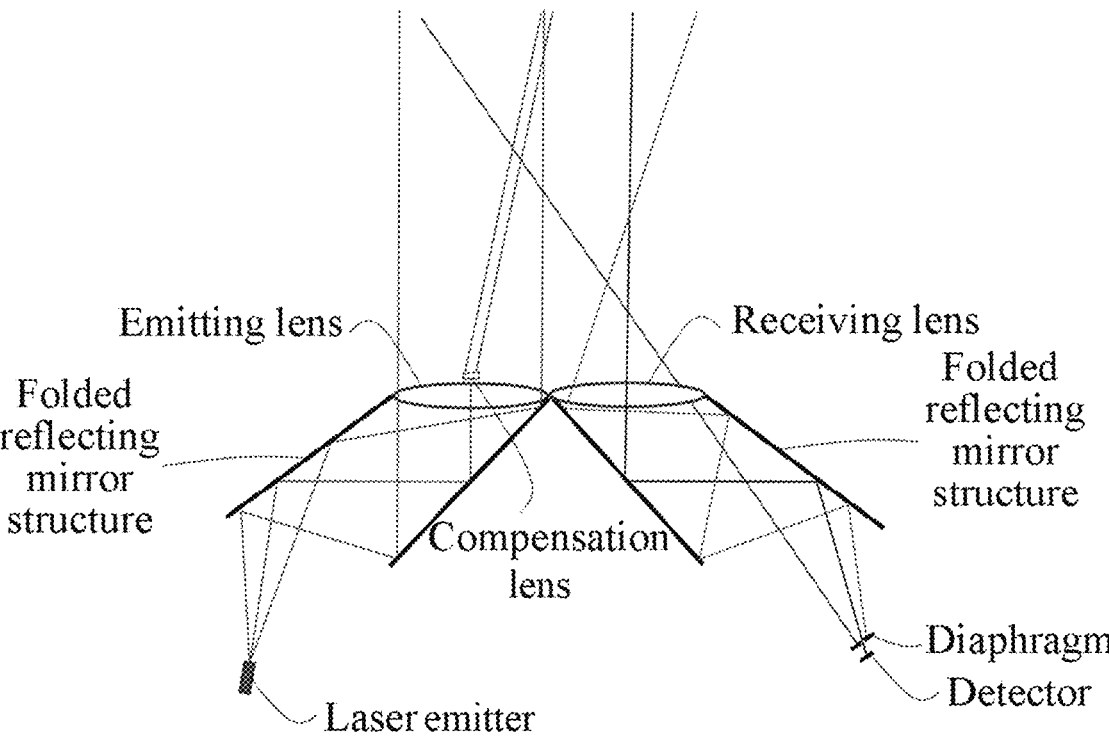
Figure 17:
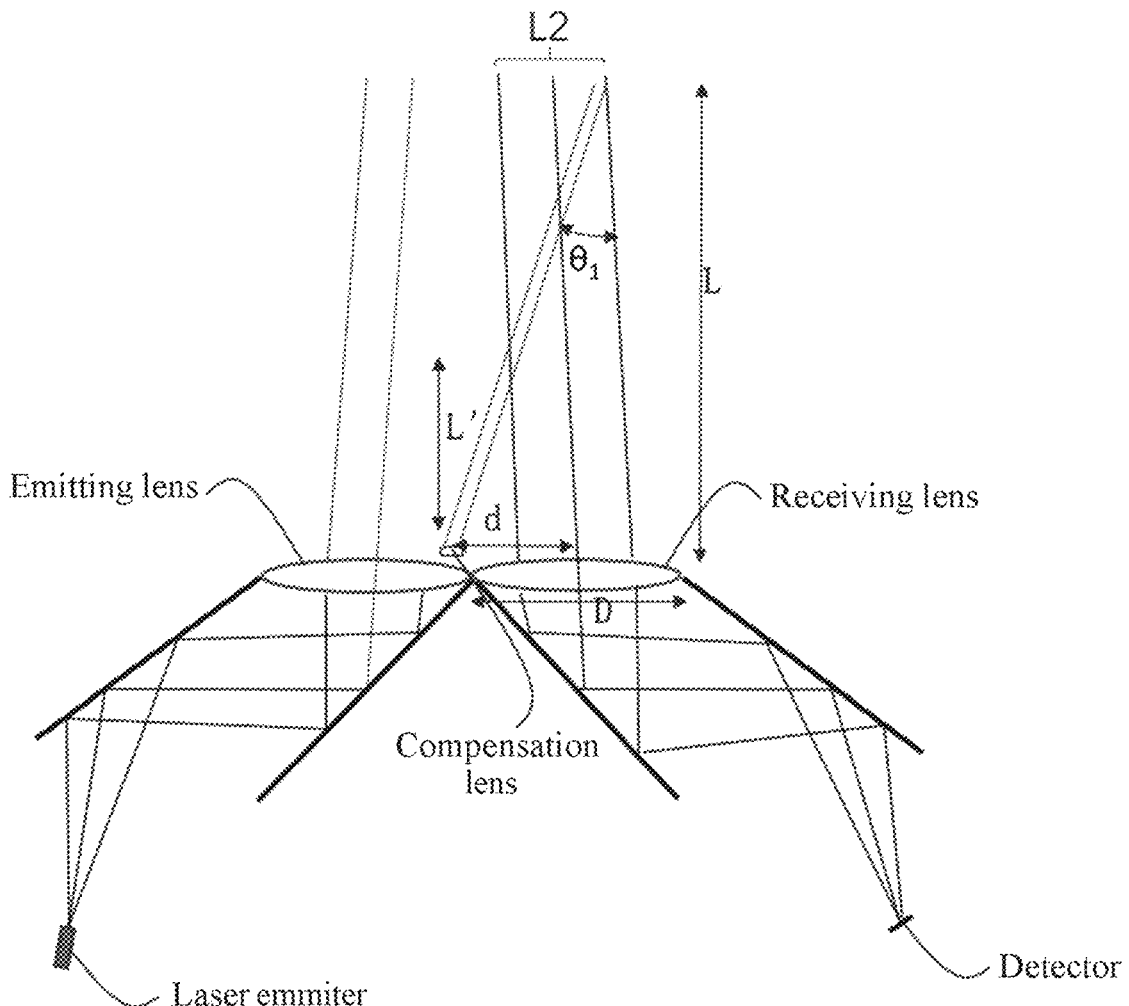
Figure 18:
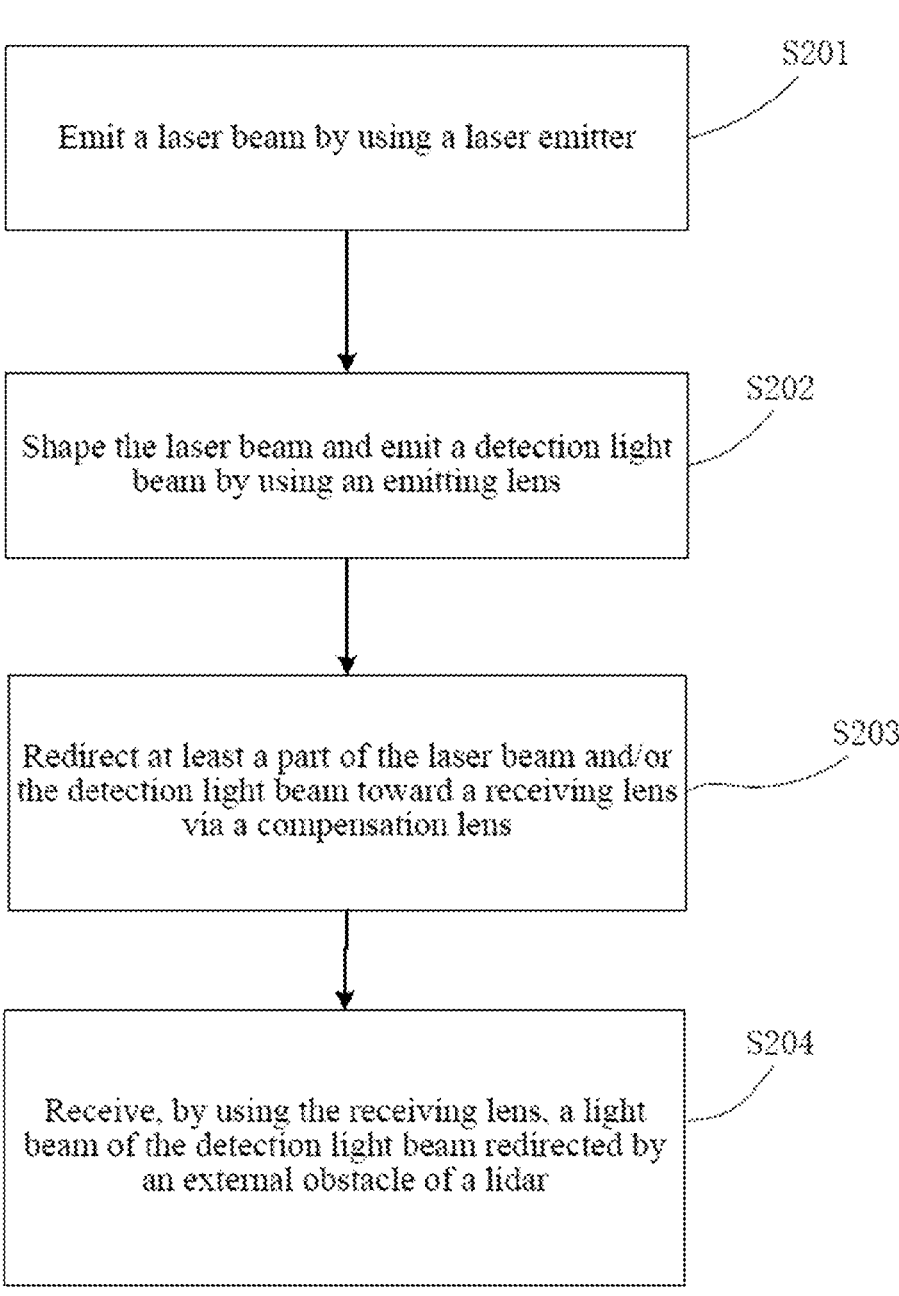

4 explain the present invention, and do not constitute an improper limitation of the present invention. In the accompanying drawings, FIG. 1 and FIG. 2 show schematic diagrams of a possible cause for generating a short-distance blind region;

FIG. 3 is a schematic diagram of a lidar according to an embodiment of the present invention;

FIG. 4 is a schematic diagram of light beams emitted by a plurality of laser emitters passing through a diaphragm on a focal plane of an emitting lens;

FIG. 5 is a schematic diagram of ghost lines in a point cloud of a lidar according to an embodiment of the present disclosure;

FIG. 6 is a schematic diagram of ghost lines caused by an emitting end according to an embodiment of the present disclosure;

FIG. 7 is a schematic diagram of ghost lines caused by a receiving end according to an embodiment of the present disclosure;

FIG. 8A is a schematic diagram of a receiving system with a diaphragm inhibiting ghost lines according to an embodiment of the present disclosure;

FIG. 8B is a schematic diagram of parameters of a diaphragm and a detector;

FIG. 9 is a schematic diagram of a strip-shaped diaphragm according to an embodiment of the present disclosure;

FIG. 10 is a schematic diagram of a circular-shaped diaphragm according to an embodiment of the present disclosure;

FIG. 11 is a schematic diagram of a receiving system with a light isolation sheet inhibiting ghost lines according to an embodiment of the present disclosure;

FIG. 12 is a schematic diagram of a light isolation sheet according to an embodiment of the present disclosure;

FIG. 13 shows a method for inhibiting ghost lines generated in a point cloud of a lidar according to an embodiment of the present disclosure;

FIG. 14 is a schematic diagram of a lidar according to an exemplary embodiment of the present invention;

FIG. 15 is a schematic diagram of a lidar according to an exemplary embodiment of the present invention;

FIG. 16 is a schematic diagram of a lidar according to an exemplary embodiment of the present invention;

FIG. 17 is a schematic diagram of a lidar according to an exemplary embodiment of the present invention; and FIG. 18 shows a method for performing detection by using a lidar according to an embodiment of the present invention.

DETAILED DESCRIPTION

Only some exemplary embodiments are briefly described below. As those skilled in the art can realize, the described embodiments may be modified in various different ways without departing from the spirit or the scope of the present invention. Therefore, the drawings and the description are to be considered as illustrative in nature but not restrictive.

In the description of the present invention, it should be understood that directions or location relationships indicated by terms "center", "longitudinal", "landscape", "length", "width", "thickness", "upper", "lower", "front", "rear", "left", "right", "vertical", "horizontal", "top", "bottom", "inner", "outer", "clockwise", and "counterclockwise" are directions or location relationships shown based on the accompanying drawings, are merely used for the convenience of describing the present invention and simplifying the description, but are not used to indicate or imply that a device or an element must have a particular direction or must be constructed and operated in a particular direction, and therefore, cannot be understood as a limitation to the present invention. In addition, the terms "first" and "second" are used merely for the purpose of description, and shall not be construed as indicating or implying relative importance or implying a quantity of indicated technical features. Therefore, a feature restricted by "first" or "second" may explicitly indicate or implicitly include one or more such features. In the descriptions of the present invention, unless otherwise explicitly specified, "multiple" means two or more than two.

In the description of the present invention, it should be noted that, unless otherwise explicitly stipulated and restricted, terms "installation", "joint connection", and "connection" should be understood broadly, which, for example, may be a fixed connection, or may be a detachable connection, or an integral connection; or may be a mechanical connection, or may be an electrical connection, or may be mutual communication; or may be a direct connection, or may be an indirect connection by using a medium, or may be an internal communication between two components, or may be an interactive relationship between two components. Persons of ordinary skill in the art may understand the specific meanings of the foregoing terms in the present invention according to specific situations.

In the present invention, unless otherwise explicitly stipulated and restricted, that a first feature is "on" or "under" a second feature may include that the first and second features are in direct contact, or may include that the first and second features are not in direct contact but in contact by using other features therebetween. In addition, that the first feature is "on", "above", or "over" the second feature includes that the first feature is right above and on the inclined top of the second feature or merely indicates that a level of the first feature is higher than that of the second feature. That the first feature is "below", "under", or "beneath" the second feature includes that the first feature is right below and at the inclined bottom of the second feature or merely indicates that a level of the first feature is lower than that of the second feature.

Many different implementations or examples are provided in the following disclosure to implement different structures of the present invention. To simplify the disclosure of the present invention, components and settings in particular examples are described below. Certainly, they are merely examples and are not intended to limit the present invention. In addition, in the present invention, reference numerals and/or reference letters may be repeated in different examples. The repetition is for the purposes of simplification and clearness, and a relationship. Moreover, the present invention provides examples of various particular processes and materials, but a person of ordinary skill in the art may be aware of application of another process and/or use of another material.

Preferred embodiments of the present invention are described below in detail with reference to the accompanying drawings. It should be understood that the preferred embodiments described herein are merely used to explain the present invention but are not intended to limit the present invention.

First Aspect

FIG. 3 is a schematic diagram of a lidar 100 according to an embodiment of the present invention. A detailed description is given below with reference to FIG. 3. As shown in FIG. 3, the lidar 100 includes a laser emitter 101, an emitting lens 102, a receiving lens 103, and a detector 105. The laser emitter 101 is, for example, an edge-emitting laser (EEL) emitter or a vertical-cavity surface-emitting laser (VCSEL) emitter, and is configured to emit a laser beam. The laser beam is incident on the emitting lens 102 disposed downstream of an optical path. The emitting lens 102 is configured to emit a detection light beam after shaping the laser beam, and the emitting lens 102 includes a diaphragm region. The detection light beam is incident on an object OB outside the lidar 100, producing diffuse reflection, and a part of the reflected light beam returns to the receiving lens 103 and is converged onto the detector 105 by the receiving lens 103. The detector 105 is, for example, a photodiode such as an avalanche photodiode (APD) or a single photon detector (for example, a SiPM, a Spad). After receiving the reflected light beam, the detector 105 generates an electrical signal that is in a specific relationship with the intensity of the light beam or a quantity of photons. The electrical signal is amplified and filtered by using a subsequent circuit, so that data signals of one or more of parameters such as a distance, an angle, and a reflectivity of an obstacle may be obtained, and thus point cloud data of the lidar is formed for subsequent processing, which is not repeated herein.

In addition, according to an embodiment of the present invention, in FIG. 3, to reduce a blind region of the lidar 100, a compensation lens 104 is disposed in the diaphragm region of the emitting lens 102. The diaphragm region is a parameter inherent to the emitting lens (or a lens assembly). The compensation lens 104 is configured to receive at least a part of the laser beam emitted by the laser emitter 101 and/or the detection light beam provided/emitted by the emitting lens 102 and redirect the part of the laser beam emitted by the laser emitter 101 and/or the detection light beam emitted by the emitting lens 102 toward the receiving lens 103. As shown in FIG. 3, the receiving lens 103 and the emitting lens 102 are, for example, disposed in parallel in a horizontal direction, and the compensation lens 104 redirects the detection light beam in a specific direction toward a side of the receiving lens 103.

It is easily understood for a person skilled in the art that the emitting lens 102 may include a single lens, or may be a lens assembly including a plurality of lenses, and all of which belong to the emitting lens as described in the present invention. When the emitting lens 102 is the single lens, the diaphragm region of the emitting lens may be located on either side of the emitting lens 102 according to an optical design, for example, on a left side or a right side of the emitting lens 102 shown in FIG. 3, that is, close to a side of the laser emitter 101 or far from a side of the laser emitter 101. When the emitting lens 102 is the lens assembly including the plurality of lenses, the diaphragm region of the emitting lens may be located on either side of the lens assembly according to the optical design or may be located in the middle of the emitting lens, that is, between two of the lenses. When the compensation lens 104 is located on a side close to the laser emitter 101, the compensation lens receives and redirects the laser beam emitted by the laser emitter 101, and then emits the detection light beam after shaping the laser beam by the emitting lens. When the compensation lens 104 is located on a side far from the laser emitter 101, the compensation lens receives and redirects the detection light beam. When the compensation lens 104 is located in the middle of the emitting lens, the compensation lens receives and redirects a partially shaped laser beam, which are all within the protection scope of the present invention.

According to an exemplary embodiment of the present invention, the compensation lens 104 includes one or more of a wedge prism, a micro prism, and a diffractive optical element, or a combination of each of a wedge prism, a micro prism, and a diffractive optical element with a spherical lens or a column lens, provided that the at least a part of the laser beam emitted by the laser emitter 101 and/or the detection light beam emitted by the emitting lens 102 can be redirected toward the receiving lens 103. The compensation lens 104 may be fixed in the diaphragm region by using a binder, a bracket, or the like.

In this embodiment of FIG. 3, by disposing the compensation lens 104 in an emitting system, a part of an emitted light beam (for example, a light beam emitted by the laser emitter or a detection light beam emitted by the emitting lens) is redirected by a particular angle toward a receiving field of view of the detector. Therefore, the light beam redirected via the compensation lens 104 begins to overlap the receiving field of view of the detector from a position (a point A in FIG. 3) close to the lidar, thereby reducing a range of a short-distance blind region. As shown in FIG. 3, a range of a new blind region is significantly less than that of an original blind region.

In the foregoing technical solution, a compensation lens 104 is disposed in a diaphragm region of an emitting system. The diaphragm region is a parameter inherent to an emitting lens (or a lens assembly), and may be located on a side of the emitting lens (assembly) or in the middle of the emitting lens assembly according to an optical design of the system. FIG. 4 shows a situation in which a plurality of laser emitters (at different heights) disposed on a focal plane of an emitting lens (assembly) 102 emit laser, where three laser emitters 101-1, 101-2, and 101-3 are schematically shown. In the diaphragm region of the emitting lens, light spots of the plurality of laser emitters are overlapped, and therefore equal ratio compensation on a plurality of laser beams may be implemented by using only one compensation lens 104. FIG. 4 is a schematic diagram of a diaphragm region (which is shown in the dotted circle in FIG. 4) located on a side (a downstream side of an optical path) of the emitting lens assembly. It can be seen in the figure that light spots of emitted light beams of the plurality of laser emitters overlap in the diaphragm region. The role of the compensation lens 104 is to separate a part of the detection light beam from the detection light beam to change a direction (or may change a divergence angle) of the part of the detection light beam and the part of the detection light beam begins to overlap the field of view of the detector from a position close to the lidar. In this way, the detector can receive signal light reflected by a short-distance target to reduce the short-distance blind region of the lidar.

According to an exemplary embodiment of the present invention, the compensation lens 104 is located at a position of the diaphragm region close to the receiving lens. FIG. 3 is a top view of the lidar 100. The emitting lens 102 and the receiving lens 103 are disposed in parallel in a horizontal direction and have approximately the same vertical height.

Second Aspect

This application claims priority to PCT international applications PCT/CN2019/103724, the contents of which are herein incorporated by reference in their entirety.

With a same focal length of lens, a lidar of a structure of folding reflecting mirrors (there are two or more reflecting mirrors between a receiving lens and a detector of the lidar to form a reflecting mirror structure to fold an optical path) can have a smaller structure size and is an architecture of a multi-line mechanical lidar according to an embodiment of the present invention. When the lidar of a structure of folding reflecting mirrors scans a high reflection plate (an obstacle with a high reflectivity such as a road sign) at a short distance, as shown in FIG. 5, there are ghost lines in an obtained point cloud of the lidar, that is, some point cloud that do not actually exist appear on a left side and a right side of the high reflection plate. During autonomous driving, when scanning a road sign having a high reflectivity, the lidar recognizes ghost lines generated in a point cloud of the lidar as an obstacle, resulting in automatic parking.

After extensive research and experiments, the applicant found that the lidar of a structure of folding reflecting mirrors may lead to the generation of ghost lines for various causes. FIG. 6 is a schematic diagram of ghost lines phenomenon caused by an emitting end. At an emitting end of the lidar, since the transmittance of a coating of an emitting lens 22 is not 100%, a laser beam emitted by a laser emitter 23 is emitted after forming multiple reflections at each glass-air interface of the emitting lens 22 and a light cover 21, and finally a short-distance target is irradiated by a very large light spot. Although the energy of the light spot is very low except a center of the light spot, the short-distance target still has a possibility of being detected when the reflectivity of the target is high.

FIG. 7 is a schematic diagram of ghost lines caused by a receiving end. At the receiving end of the lidar, in an optical path of folding reflecting mirrors, in addition to a main field of view in which a light beam is reflected once by each reflecting mirror, there is also a field of view in which the light beam is not reflected by the reflecting mirror and a field of view in which a total quantity of times that the light beam is reflected by the reflecting mirror exceeds a quantity of reflecting mirrors. When the lidar performs scanning, a detector at the receiving end receives a light beam that is not reflected by the reflecting mirror and/or a light beam of which a total quantity of times that the light beam is reflected by the reflecting mirror exceeds the quantity of reflecting mirrors, resulting in ghost lines. As shown in FIG. 7, the field of view of the lidar includes: a main field of view FOV B, and ghost line fields of view FOV A and FOV C. The main field of view FOV B is a field of view in which a light beam is reflected once by each of a first reflecting mirror 311 and a second reflecting mirror 312. The ghost line field of view FOV A is a field of view in which a light beam is not reflected by the first reflecting mirror 311 and the second reflecting mirror 312, and the ghost line field of view FOV C is a field of view in which a total quantity of times that the light beam is reflected by the first reflecting mirror 311 and the second reflecting mirror 312 exceeds two.

It is assumed that the lidar performs counterclockwise scanning, when the main field of view FOV B is still outside a high reflection plate, the high reflection plate can be already seen from the ghost line field of view FOV A. Because the high reflection plate is at a relatively short distance, the high reflection plate is illuminated by a large light spot of the emitting end. Therefore, the detector 32 receives a light beam through an optical path of the ghost line field of view FOV A, and generates ghost lines on a right side of the high reflection plate. The lidar continues to perform scanning, and when the main field of view FOV B leaves the high reflection plate and the ghost line field of view FOV C is still on the high reflection plate, the detector 32 may still receive a reflected light beam of the high reflection plate through an optical path of the ghost line field of view FOV C, thereby generating ghost lines on a left side of the high reflection plate. Alternatively, when the lidar performs clockwise scanning, a high reflection plate is seen from the ghost line field of view FOV C prior to the main field of view FOV B. When the main field of view FOV B leaves the high reflection plate, the ghost line field of view FOV A is still on the high reflection plate, and the ghost line fields of view FOV A and FOV C respectively cause ghost lines on a right side and a left side of the high reflection plate, where the detector 32 is, for example, a photodiode such as an avalanche photodiode (APD), or a single photon detector (for example, a SiPM or a Spad).

To reduce or inhibit the problem of ghost lines described above, the present disclosure provides a receiving system used for a lidar, including: a receiving lens, a reflecting mirror structure, a detector, and a module for reducing ghost lines. The reflecting mirror structure is disposed downstream of an optical path of the receiving lens, the detector is disposed downstream of an optical path of the reflecting mirror structure, and the module for reducing ghost lines is disposed between the reflecting mirror structure and the detector. External light beams enter the reflecting mirror structure through the receiving lens, are reflected by a plurality of reflecting mirrors in the reflecting mirror structure to change a propagation direction, and then pass through the module for reducing ghost lines, so that a part or all of the light beams that cause ghost lines in a point cloud of the lidar are blocked by the module for reducing ghost lines, and finally the remaining light beams reach the detector.

A field of view of the lidar in this embodiment of the present disclosure includes: a main field of view and a ghost line field of view. The main field of view is a field of view in which a light beam is reflected once by each reflecting mirror, and the ghost line field of view is a field of view in which a light beam is not reflected by the reflecting mirror and/or a total quantity of times that the light beam is reflected by the reflecting mirror exceeds a quantity of reflecting mirrors. Because there is a gap between the ghost line field of view and the main field of view at a specific position of an optical path, a diaphragm and/or a light isolation sheet may be used as the module for reducing ghost lines to block the optical path of the ghost line field of view, thereby inhibiting the high reflection plate at a short distance from generating ghost lines in the point cloud of the lidar.

An embodiment of the present disclosure is described in detail below with reference to FIG. 8A to FIG. 10.

FIG. 8A is a schematic diagram of a receiving system 40 used for a lidar according to an embodiment of the present disclosure. As shown in FIG. 8A, the receiving system 40 used for a lidar includes a receiving lens 41, a reflecting mirror structure, a diaphragm 44, and a detector 43, the reflecting mirror structure including a first reflecting mirror 421 and a second reflecting mirror 422. The receiving lens 41 may receive an external light beam, for example, a laser beam emitted from a lidar and reflected by an external object. The first reflecting mirror 421 and the second reflecting mirror 422 are disposed downstream of an optical path of the receiving lens 41, and both are disposed opposite to each other. The light beam received by the receiving lens is incident on the reflecting mirror structure, and a propagation direction of the light beam is changed by being reflected via the first reflecting mirror 421 and the second reflecting mirror 422. The detector 43 is disposed downstream of an optical path of the reflecting mirror structure, and is configured to receive a light beam reflected from the reflecting mirror structure and generate an electrical signal. Signal processing such as filtering, amplification, AD conversion, or digital signal processing is further performed on the electrical signal, to form point cloud data of the lidar. The diaphragm 44 is disposed between the reflecting mirror structure and the detector 43, may allow light in the main field of view to pass through and to be incident on the detector 43, and simultaneously may limit the passage of a part of the light beam, for example, may partially or completely block the light beam that causes ghost lines in the point cloud of the lidar, to prevent the light beam that causes ghost lines from being incident on the detector. As shown in FIG. 8A, a light beam corresponding to the main field of view FOV B is redirected to a certain extent after passing through the receiving lens 41, then is incident on the first reflecting mirror 421 and is reflected by the first reflecting mirror 421, and then is reflected by the second reflecting mirror 422. Finally, the light beam after being reflected by the second reflecting mirror 422 may pass through the diaphragm 44 and is irradiated on the detector 43 to generate an electrical signal. A light beam corresponding to the ghost line field of view FOV A is not incident on the first reflecting mirror 421 or the second reflecting mirror 422 after passing through the receiving lens 41, but is directly irradiated on the diaphragm 44 and is blocked or absorbed by the diaphragm 44, so as to prevent the light beam from being irradiated on the detector 43 and causing ghost lines in the point cloud of the lidar. After passing through the receiving lens 41, a light beam corresponding to the ghost line field of view FOV C is incident on the first reflecting mirror 421, is reflected by the first reflecting mirror 421 onto the second reflecting mirror 422, then is reflected by the second reflecting mirror 422 onto the first reflecting mirror 421, then is reflected once by each of the first reflecting mirror 421 and the second reflecting mirror 422, and finally is incident on the diaphragm 44, and is blocked or absorbed by the diaphragm 44, so as to prevent the light beam from being irradiated on the detector 43 and causing ghost lines in the point cloud of the lidar.

Therefore, by disposing the diaphragm 44 between the reflecting mirror structure and the detector 43 as the module for reducing ghost lines, at least a part of light being incident on the detector 43 that causes ghost lines in the point cloud of the lidar may be blocked.

In addition, it is easily understood by a person skilled in the art that there are two reflecting mirrors in this embodiment of FIG. 8A, which is only an example, or more reflecting mirrors may be included, for example, there may be three or four reflecting mirrors. The quantity of reflecting mirrors is not limited in the present disclosure.

According to an exemplary embodiment of the present disclosure, when a distance between the diaphragm 44 and the detector 43 satisfies a specific relationship, the light beams in the ghost line fields of view FOV A and FOV C may be blocked more effectively.

Specifically, it is assumed that a diameter of the receiving lens 41 is D, a focal length thereof is f, a distance between the diaphragm 44 and the detector 43 (for example, a single APD, or, a linear array or a planar array of APD) is h, and a horizontal width of the diaphragm 44 is d1 (as shown in FIG. 8B), when the horizontal width d1 of the diaphragm 44 and the distance h between the diaphragm 44 and the detector 43 satisfy the following relation, the light beams in the ghost line fields of view FOV A and FOV C may be blocked more effectively:

$$\arctan\left(\frac{d1}{2h}\right) \le \arctan\left(\frac{D}{2f}\right).$$

As shown in FIG. 8A, when the lidar performs counterclockwise or clockwise scanning, the light beams in the ghost line fields of view FOV A and FOV C are blocked by the diaphragm 44 and cannot reach the detector 43, but the light beam of the main field of view FOV B may reach the detector 43 through the diaphragm 44, thereby inhibiting or even eliminating ghost lines generated by the high reflection plate at a short distance in the point cloud of the lidar, avoiding the misrecognition of the lidar, and improving the detection accuracy.

As described above, the reflecting mirror structure may include a plurality of reflecting mirrors, and the module for reducing ghost lines, for example, the diaphragm 44, is configured to block a light beam that is not reflected once by the reflecting mirror structure. In the present invention, the light beam reflected once by the reflecting mirror structure is a light beam (for example, the light beam of the field of view FOV B in FIG. 8A) reflected once by each reflecting mirror in the reflecting mirror structure. The light beam that is not reflected once by the reflecting mirror structure refers to that the light beam (for example, the light beam corresponding to the ghost line field of view FOV A in FIG. 8A) is not reflected by at least one of the reflecting mirrors in the reflecting mirror structure, or the light beam (for example, the light beam corresponding to the ghost line field of view FOV C in FIG. 8A) is reflected more than twice by at least one of the reflecting mirrors in the reflecting mirror structure.

According to a receiving system of an embodiment of the present disclosure, the diaphragm may be made of a material such as metal, glass that is capable of absorbing or reflecting light, or ceramic.

According to a receiving system of an embodiment of the present disclosure, the diaphragm includes: a strip-shaped aperture or a circular-shaped aperture. FIG. 9 is a schematic diagram of an embodiment of a strip-shaped diaphragm according to the present disclosure. FIG. 10 is a schematic diagram of an embodiment of a circular-shaped diaphragm according to the present disclosure. Alternatively, a shape of the diaphragm may be square or elliptical, and the shape of the diaphragm is not limited in the present disclosure.

FIG. 9 is a schematic diagram of a strip-shaped diaphragm according to an embodiment of the present disclosure. As shown in FIG. 9, a diaphragm 52 is a strip-shaped aperture 51 and a horizontal width of the strip-shaped aperture is d1. The diaphragm 52 is disposed on a bracket 53. For example, the diaphragm 52 may be affixed to the bracket 53. The bracket 53 is disposed in front of a circuit board 55. The detector 54 may be arranged in a linear array or planar array on the circuit board 55. A distance between the diaphragm 52 and the detector 54 is h. d1 and h satisfy the restriction relation described above. For example, when a horizontal width of the strip-shaped aperture is determined as d1, an equal sign is placed in the restriction relation, and the distance h between the diaphragm 52 and the detector 54 may be determined. A quantity of line arrays (a quantity of columns) of the detectors 54 corresponds to a quantity of strip-shaped apertures of the diaphragm 52. As shown in FIG. 9, six columns of detectors 54 are disposed on the circuit board 55. Correspondingly, six strip-shaped apertures 51 are disposed on the diaphragm 52, where the width of the strip-shaped aperture 51 is d1, a distance between centers of adjacent strip-shaped apertures 51 is set with reference to a distance between centers of adjacent line arrays of the detectors 54 on the circuit board 55, and a length of the strip-shaped aperture is also set with reference to a length of the line array of the detector 54 on the circuit board 55. That is, all the light beams from the ghost line fields of view may be blocked from being incident on APD arrays. Certainly, the quantity of strip-shaped apertures may also be adjusted as required to block a part of the light beams from the ghost line fields of view to reach APD arrays.

When the detector 54 rotates around a rotating axis of the lidar and performs scanning, the light beams of the ghost line fields of view FOV A and FOV C are blocked by a left side and a right side of the strip-shaped aperture 51 of the diaphragm 52, limiting the passage of the light beams of the ghost line fields of view FOV A and FOV C, but the light beam of the main field of view FOV B may reach the detector 54 through the strip-shaped aperture 51 of the diaphragm 52.

FIG. 10 is a schematic diagram of a circular-shaped diaphragm according to an embodiment of the present disclosure. As shown in FIG. 10, a diaphragm 62 is a circular-shaped aperture 61, and a horizontal width of the circular-shaped aperture is d1 (that is, a diameter of the circular-shaped aperture is d1). The diaphragm 62 is disposed on a bracket 63. For example, the diaphragm 62 may be affixed to the bracket 63. The bracket 63 is disposed in front of a circuit board 65, that is, in front of a detector 64 on the circuit board 65, where the detector 64 may be, but is not limited to, a photodiode such as an APD. A distance between the diaphragm 62 and the detector 64 is h. d1 and h satisfy the restriction relation described above. For example, when a horizontal width of the circular-shaped aperture of the diaphragm is determine as d1 (that is, the diameter of the circular-shaped aperture), an equal sign is placed in the restriction relation, and the distance h between the diaphragm 52 and the detector 54 may be determined. Each detector 64 corresponds to one circular-shaped aperture 61 of the diaphragm 62. A quantity of line arrays (a quantity of columns) of the detectors 64 corresponds to a quantity of columns of the strip-shaped apertures 61 of the diaphragm 62. As shown in FIG. 10, three columns of detectors 64 are disposed on the circuit board 65, and correspondingly, three columns of circular-shaped apertures 61 are disposed on the diaphragm 62, which may block all the light beams from the ghost line fields of view from being incident on APD arrays. Certainly, the quantity of circular-shaped apertures may also be adjusted as required to block part of the light beams from the ghost line fields of view to reach APD arrays.

When the detector 64 rotates around a rotating axis of the lidar and performs scanning, the light beams of the ghost line fields of view FOV A and FOV C are blocked by the circumference of the circular-shaped aperture 61 of the diaphragm 62, limiting the passage of the light beams of the ghost line fields of view FOV A and FOV C, but the light beam of the main field of view FOV B may reach the detector 64 through the circular-shaped aperture 61 of the diaphragm 62.

Another embodiment of the present disclosure is described in detail below with reference to FIG. 11 and FIG. 12.

FIG. 11 is a schematic diagram of a receiving system 70 used for a lidar according to an embodiment of the present disclosure. As shown in FIG. 11, the receiving system 70 used for a lidar includes a receiving lens 71, a reflecting mirror structure, a light isolation sheet 74, and a detector 73, the reflecting mirror structure including a first reflecting mirror 721 and a second reflecting mirror 722. The receiving lens 71 may receive external light beams. The first reflecting mirror 721 and the second reflecting mirror 722 disposed opposite to each other downstream of an optical path of the receiving lens 71 may receive the light beams and change propagation directions of the light beams by reflection. The light isolation sheet 74 disposed downstream of optical paths of the first reflecting mirror 721 and the second reflecting mirror 722 may block some or all of the light beams that cause ghost lines in the point cloud of the lidar. Finally, the detector 73 disposed downstream of an optical path of the light isolation sheet 74 receives the light beams that are not blocked by the light isolation sheet 74. The detector 73 may rotate around a rotating axis of the lidar. Alternatively, there may be three or four reflecting mirrors, and the quantity of reflecting mirrors is not limited in the present disclosure.

The light isolation sheet 74 may be disposed on a left side and a right side of the detector 73, and may be disposed directly on a circuit board. When the detector 73 rotates around the rotating axis of the lidar and performs scanning, the light beams of the ghost line fields of view FOV A and FOV C are blocked by the light isolation sheet 74 on the left side and the right side of the detector 73, limiting the light beams of the ghost line fields of view FOV A and FOV C from reaching the detector 73, but the light beam of the main field of view FOV B is not blocked by the light isolation sheet 74 and may reach the detector 73.

The detector 73 may be arranged in a linear array or a planar array on the circuit board. For a case of a plurality of detector arrays, some light isolation sheets may be reused as required to reduce the quantity of light isolation sheets used and achieve an effect of inhibiting ghost lines generated by the high reflection plate at a short distance in the point cloud of the lidar. There is a plurality of light isolation sheets in the present disclosure, for example, two, three, or four, and the quantity of light isolation sheets is not limited in the present disclosure.

FIG. 12 is a schematic diagram of a light isolation sheet according to an embodiment of the present disclosure. a is a main view, and b is a right view. As shown in a in FIG. 12, detector arrays 81, 82, and 83 are disposed on a circuit board 87, light isolation sheets 84, 85, and 86 are also disposed on the circuit board 87, and preferably the light isolation sheets 84, 85, and 86 are perpendicular to the circuit board 87. The detector arrays 81 and 82 share the light isolation sheet 85, and the detector arrays 82 and 83 share the light isolation sheet 86. The ghost lines generated by the high reflection plate at a short distance in the point cloud of the lidar may also be inhibited while the quantity of light isolation sheets used is reduced.

According to an exemplary embodiment of the present disclosure, a focal length of the receiving lens of the receiving system is set to 69 mm, an angle between the first reflecting mirror and a horizontal direction is 45 degrees, and an angle between the second reflecting mirror and the horizontal direction is 51 degrees. As shown in a in FIG. 12, from the left to the right, horizontal distances between the centers of each of APD arrays and the light isolation sheet are 2.45 mm, 1.95 mm, and 1.25 mm respectively. From the left to the right, the heights of the light isolation sheets are 4 mm, 4 mm, and 3.2 mm respectively, which can achieve a good effect of inhibiting the ghost line fields of view.

In the foregoing embodiments, a system of the lidar respectively includes a diaphragm or a light isolation sheet, as a module for reducing ghost lines. According to a receiving system of an embodiment of the present disclosure, the module for reducing ghost lines may further simultaneously use the diaphragm and the light isolation sheet to achieve the objective of inhibiting ghost lines generated by the high reflection plate at a short distance in the point cloud of the lidar.

The present disclosure further provides a lidar including: an emitting system and the receiving system described above. The emitting system may emit a laser beam that detects a target, and the receiving system may receive an echo which the laser beam is reflected by the target. When the detected target is a short-distance obstacle with a high reflectivity, the receiving system may inhibit ghost lines generated by the obstacle with the high reflectivity in the point cloud of the lidar, thereby avoiding the misrecognition of the lidar, and improving the detection accuracy. In addition, the module for reducing ghost lines does not block the light beam of the main field of view, and therefore the impact on the long-distance ranging capability of the lidar is minimized.

FIG. 13 shows a method 100 for inhibiting ghost lines generated in a point cloud of a lidar according to an embodiment of the present disclosure. As shown in FIG. 13, the specific steps are as follows.

Step S101. Receive a light beam from the outside of a lidar by using a receiving lens.

Step S102. Receive, by using a reflecting mirror structure, a light beam from the receiving lens and change, through reflection, a propagation direction of the light beam.

Step S103. Block a light beam causing ghost lines in a point cloud of the lidar from the reflecting mirror structure.

Step S104. Receive, by using a detector, an unblocked light beam from the reflecting mirror structure.

According to an embodiment of the present disclosure, the step of blocking a light beam causing ghost lines in a point cloud of the lidar from the reflecting mirror structure includes: blocking, by using a diaphragm and/or a light isolation sheet, the light beam that causes ghost lines in the point cloud of the lidar.

According to the receiving system of the lidar in the present disclosure, by using a module for reducing ghost lines such as a specific diaphragm and/or a light isolation sheet, a problem of misrecognition of the lidar caused by a ghost generated by a short-distance obstacle with a high reflectivity in a point cloud of the lidar is resolved. In autonomous driving application, when the lidar of the present disclosure scans a road sign of a high reflectivity at a short distance, ghost lines generated by the road sign in a point cloud of the lidar can be avoided, which improves the detection accuracy.

Third Aspect

The technical solution of adding a compensation lens in the first aspect of the present invention may be combined with the solution of eliminating ghost lines in the second aspect of the present invention.

FIG. 14 is a schematic diagram of a lidar 100 according to an exemplary embodiment of the present invention. As shown in FIG. 14, in addition to the laser emitter 101, the emitting lens 102, the receiving lens 103, the compensation lens 104, and the detector 105, the lidar 100 further includes a reflecting mirror structure at a receiving end. The reflecting mirror structure at the receiving end includes two or more reflecting mirrors. The two reflecting mirrors 107-1 and 107-2 are schematically shown in the figure. A person skilled in the art may easily understand that the reflecting mirror structure at the receiving end may also include more reflecting mirrors. The reflecting mirror structure at the receiving end is disposed downstream of an optical path of the receiving lens 103 and is located between the receiving lens 103 and the detector 105, and is configured to receive an echo light beam converged by the receiving lens 103, and after being reflected by the reflecting mirror, cause the echo light beam to be incident on the detector 105. In addition, the lidar 100 further includes a module for reducing ghost lines located between the reflecting mirror structure at the receiving end and the detector as described in the second aspect of the present invention, to block the light beam that causes ghost lines in the point cloud of the lidar from being incident on the detector. The module for reducing ghost lines shown in FIG. 14 is a diaphragm 108. The diaphragm 108 can block light beams L1 and L3 of ghost line fields of view FOV A and FOV C from being incident on the detector 105, but does not or substantially does not block a light beam L2 of a main field of view FOV B from being incident on the detector 105.

According to an exemplary embodiment of the present invention, the diaphragm and the detector satisfy the following relation:

$$\arctan\left(\frac{d1}{2h}\right) \le \arctan\left(\frac{D}{2f}\right)$$

where D is a diameter of the receiving lens, f is a focal length of the receiving lens, h is a distance between the diaphragm and the detector, and d1 is a width of the diaphragm. As described with reference to FIG. 8B, details are not repeated herein.

As described in the second aspect of the present invention, the diaphragm 108 is a strip-shaped aperture or a circular-shaped aperture, and the diaphragm is made of any one of the following materials: metal, glass that is capable of absorbing or reflecting light, or ceramic.

Alternatively, as described in the second aspect of the present invention, the module for reducing ghost lines includes a light isolation sheet. Details are not described herein again. Preferably, the module for reducing ghost lines is configured to block a light beam that is not reflected once by the reflecting mirror structure at the receiving end. For example, in a case that the reflecting mirror structure at the receiving end includes the first reflecting mirror 107-1 and the second reflecting mirror 107-2 disposed opposite to each other shown in FIG. 14, the module for reducing ghost lines is configured to block light beams other than those light beams reflected once by each of the first reflecting mirror and the second reflecting mirror.

In addition, preferably, as shown in FIG. 14, an angle between a light beam redirected by the compensation lens 104 and a main field of view of the lidar is $\theta_1$ less than angles $\theta_2$ and $\theta_3$ between ghost line fields of view and the main field of view.

The compensation lens of the present invention causes a small part of light beams to be redirected. An angle $\theta_1$ between the redirected light beam and the main field of view of the detector is less than angles $\theta_2$ and $\theta_3$ between the ghost line fields of view and the main field of view of a mechanical lidar of a folding optical path with double reflecting mirrors. As shown in FIG. 14, a line L2 represents a light beam of the main field of view FOV B of the detector, and lines L1 and L3 represent light beams of the ghost line fields of view FOV A and FOV C. Therefore, the ghost line fields of view on the lidar are eliminated by using the diaphragm solution, and no new ghost lines are introduced. If the angle $\theta_1$ between the light beam redirected by the compensation lens 104 and the main field of view of the lidar is greater than the angle $\theta_2$ or $\theta_3$ between the original ghost line field of view and the main field of view, new ghost lines are introduced on two sides of the redirected light beam. New ghost lines are usually introduced when the compensation lens is disposed in the receiving system of the lidar.

In addition, the lidar 100 further includes a reflecting mirror structure at an emitting end. The reflecting mirror structure at the emitting end includes at least one reflecting mirror. As shown in FIG. 14, two reflecting mirrors 106-1 and 106-2 are schematically shown in the figure. A person skilled in the art easily understands that the reflecting mirror structure at the emitting end may also include more or fewer reflecting mirrors. The reflecting mirror structure at the emitting end is disposed between the laser emitter 101 and the emitting lens 102, and is configured to receive a laser beam emitted by the laser emitter 101, cause the laser beam to be incident on the emitting lens 102 through reflection, and then emit the laser beam after being shaped.

FIG. 15 shows an embodiment of the present invention. In this embodiment, components of a system of the lidar mainly include: a laser emitter, an emitting lens, a compensation lens, a receiving lens, a folding reflecting mirror structure at the receiving end, and a detector (for example, an APD). The compensation lens is, for example, located (in a diaphragm region), in the center of the emitting lens.

FIG. 16 shows another embodiment of the present invention. A difference between this embodiment and that of FIG. 15 is that a diaphragm that blocks a ghost line field of view is added to a lidar structure. The compensation lens may be a wedge prism, a micro prism, a diffractive element, or a combination of a wedge prism, a micro prism, and a diffractive element with a spherical lens or a cylindrical lens, which can redirect a small part of an emitted light beam by a particular angle. In addition, the compensation lens may be fixed on the emitting lens by using a binder or a bracket.

According to an exemplary embodiment of the present invention, the emitting lens and the receiving lens are disposed in parallel in a horizontal direction, and a relationship between a redirection angle of the compensation lens and reduction of a range of a short-distance blind region is shown in FIG. 17.

In FIG. 17, a light beam redirection angle is $\theta_1$ ($\theta_1$ is an angle between the light beam redirected by the compensation lens and a received light beam [that is, a light beam L2 of a main field of view]), a distance between a mounting position of the compensation lens and the center of the receiving lens is d, a diameter of the receiving lens is D, the range between L and L' represents a short-distance region with enhanced signals, marked by the distance between the outmost point of the receiving lens and an intersection point that is formed by the redirected light beam via the compensation lens and the reflected light beam, L represents the farthest range while L' represents the nearest range, as shown in the figure, and the following relations are satisfied between the foregoing:

$$\frac{d + D/2}{L} = \tan\theta_1$$

$$L' = L - D/\tan\theta_1$$

Therefore, through the relations, parameters such as the mounting position of the compensation lens and the redirection angle may be determined according to the nearest range L' that needs to be enhanced.

In the present invention, a light isolation sheet may also be used to block the ghost line field of view. The specific content is clearly described in the previous specification of the ghost line field of view, and are not repeated herein.

The present invention further relates to a method 200 for performing detection by using the lidar 100 described above. As shown in FIG. 18, the method includes the following steps.

Step S201. Emit a laser beam by using a laser emitter.

Step S202. Shape the laser beam and emit a detection light beam by using an emitting lens.

Step S203. Redirect at least a part of the laser beam and/or the detection light beam toward a receiving lens by using a compensation lens.

Step S204. Receive, by using the receiving lens, a light beam of the detection light beam reflected by an object external to a lidar.

The foregoing descriptions are merely preferred embodiments of the present invention, but are not intended to limit the present invention. Any modification, equivalent replacement, or improvement made within the spirit and principle of the present disclosure shall fall within the protection scope of the present invention.

It should be finally noted that the foregoing descriptions are merely preferred embodiments of the present invention, but are not intended to limit the present invention. Although the present invention has been described in detail with reference to the foregoing embodiments, for a person of ordinary skill in the art, modifications can be made to the technical solutions described in the foregoing embodiments, or equivalent replacements can be made to some technical features in the technical solutions. Any modification, equivalent replacement, or improvement made within the spirit and principle of the present invention shall fall within the protection scope of the present invention.

What is claimed is:

1. A lidar, comprising:
a laser emitter, configured to emit a laser beam;
an emitting lens, disposed downstream of an optical path of the laser emitter, configured to provide a detection light beam after shaping the laser beam, and the emitting lens comprising a diaphragm region;
a receiving lens, configured to receive a reflected light beam of the detection light beam after being reflected outside the lidar; and
a compensation lens, disposed in the diaphragm region of the emitting lens, and configured to receive at least a part of the laser beam and/or the detection light beam and redirect the received part of the laser beam and/or the detection light beam toward the receiving lens, wherein the compensation lens comprises one or more of a wedge prism, a micro prism, and a diffractive optical element, or a combination of the wedge prism, the micro prism, and the diffractive optical element with a spherical lens or a cylindrical lens,
wherein an angle between a light beam redirected by the compensation lens and a main field of view of the lidar is less than an angle between a ghost line field of view and the main field of view, and
the lidar further comprises a reflecting mirror structure and a detector at a receiving end sequentially disposed downstream of an optical path of the receiving lens, and further comprises a module for reducing ghost lines located between the reflecting mirror structure and the detector to prevent a light beam that causes ghost lines in a point cloud of the lidar from being incident on the detector,
wherein the module for reducing ghost lines comprises a diaphragm, the diaphragm and the detector satisfying a second relation:

$$\arctan\left(\frac{d1}{2h}\right) \le \arctan\left(\frac{D}{2f}\right)$$

18 wherein D is a diameter of the receiving lens, f is a focal length of the receiving lens, h is a distance between the diaphragm and the detector, and d1 is a width of the diaphragm.

2. The lidar according to claim 1, wherein the diaphragm region is located on a side of the emitting lens close to the laser emitter, or a side of the emitting lens far from the laser emitter, or in the middle of the emitting lens.

3. The lidar according to claim 1, wherein the compensation lens is fixed in the diaphragm region by using a binder or a bracket.

4. The lidar according to claim 1, wherein the compensation lens is located at a position of the diaphragm region close to the receiving lens.

5. The lidar according to claim 4, wherein the emitting lens and the receiving lens are disposed in parallel in a horizontal direction, and a position of the compensation lens satisfies first relations:

$$\frac{d + D/2}{L} = \tan\theta_1$$

wherein $\theta_1$ is a redirection angle of a light beam, which is an angle between a light beam redirected via the compensation lens and a light beam received by the receiving lens,
d is a distance between a mounting position of the compensation lens and a center of the receiving lens,
D is the diameter of the receiving lens, and
a difference between L and L' represents a short-distance region with enhanced signals, marked by the distance between the outmost point of the receiving lens and an intersection point that is formed by the redirected light beam via the compensation lens and the reflected light beam, and L represents the farthest range while L' represents the nearest range.

6. The lidar according to claim 1, wherein the diaphragm is strip-shaped or circular-shaped, and the diaphragm is made of one of metal, glass that is capable of absorbing or reflecting light, or ceramic.

7. The lidar according to claim 1, wherein the module for reducing ghost lines further comprises a light isolation sheet.

8. The lidar according to claim 1, wherein the module for reducing ghost lines is configured to prevent a light beam not reflected once by the reflecting mirror structure.

9. The lidar according to claim 1, wherein the reflecting mirror structure comprises a first reflecting mirror and a second reflecting mirror disposed opposite to each other, the detector comprises a photodiode, and the module for reducing ghost lines is configured to block light beams other than light beams respectively reflected once by the first reflecting mirror and the second reflecting mirror.

10. A method for performing detection by using a lidar that comprises a laser emitter, an emitting lens, a receiving lens, and a compensation lens, the method comprising:
emitting, by the laser emitter, a laser beam;
shaping, by the emitting lens, the laser beam and emitting a detection light beam, wherein the emitting lens is disposed downstream of an optical path of the laser emitter and comprises a diaphragm region;
receiving, by the receiving lens, a reflected light beam of the detection light beam after being reflected by an object external to the lidar; and
receiving, by the compensation lens, at least a part of the laser beam and/or the detection light beam, and redirecting the received part of the laser beam and/or the detection light beam towards the receiving lens, wherein the compensation lens is disposed in the diaphragm region of the emitting lens, wherein the compensation lens comprises one or more of a wedge prism, a micro prism, and a diffractive optical element, or a combination of the wedge prism, the micro prism, and the diffractive optical element with a spherical lens or a cylindrical lens, wherein an angle between a light beam redirected by the compensation lens and a main field of view of the lidar is less than an angle between a ghost line field of view and the main field of view, and the lidar further comprises a reflecting mirror structure and a detector at a receiving end sequentially disposed downstream of an optical path of the receiving lens, and further comprises a module for reducing ghost lines located between the reflecting mirror structure and the detector to prevent a light beam that causes ghost lines in a point cloud of the lidar from being incident on the detector, wherein the module for reducing ghost lines comprises a diaphragm, the diaphragm and the detector satisfying a second relation:

$$\arctan\left(\frac{d1}{2h}\right) \le \arctan\left(\frac{D}{2f}\right)$$

wherein D is a diameter of the receiving lens, f is a focal length of the receiving lens, h is a distance between the diaphragm and the detector, and d1 is a width of the diaphragm.

* * * * *